Jan. 23, 1962  M. P. WHITE  3,018,456

SWITCHING DEVICES

Filed July 18, 1957

United States Patent Office 3,018,456
Patented Jan. 23, 1962

3,018,456
SWITCHING DEVICES
Marshall P. White, Cheektowaga, N.Y., assignor to Westinghouse Electric Corporation, East Pittsburgh, Pa., a corporation of Pennsylvania
Filed July 18, 1957, Ser. No. 672,819
5 Claims. (Cl. 336—110)

This invention relates, generally, to switching devices and, more particularly, to switching devices of the contactless type.

An object of the invention is to provide a contactless switch of the saturable reactor type having a relatively high output or capacity.

Another object of the invention is to provide a contactless switch having a rapid change in its output during operation of the switch.

A further object of the invention is to provide a contactless switch which will not cause vibration of the contact members of relays controlled by the switch.

Other objects of the invention will be explained fully hereinafter or will be apparent to those skilled in the art.

In accordance with one embodiment of the invention, a permanent magnet which saturates the core of the reactor for a contactless switch is so mounted that it is free to move a predetermined distance within the switch assembly. When a shorting bar composed of magnetic material approaches the switch unit the magnet is snapped away from the reactor toward the shorting bar, thereby causing a greater change in the saturation of the reactor than can be obtained with switches in which the magnet is stationary and the shorting bar is moved to a position adjacent to the magnet. Thus, the capacity of the switch is increased as the core may now be saturated more fully in the "on" position to give good regulation of the output and still have a low saturation in the "off" position to give a low "off" signal.

For a better understanding of the nature and objects of the invention, reference may be had to the following detailed description, taken in conjunction with the accompanying drawing, in which.

Figure 1:
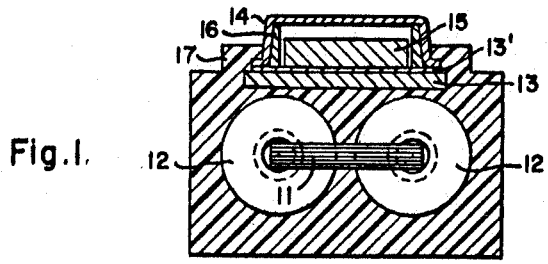
FIGURE 1 is a view, partly in section and partly in end elevation, of a switching device embodying the principal features of the invention and showing the magnet in position to saturate the core of the reactor.

Referring to the drawing, the switching device shown therein comprises a hollow rectangular core 11 having coils 12 wound upon opposite legs of the core. The core 11 is preferably composed of a plurality of laminations of magnetic material. A non-magnetic spacer 13 is disposed adjacent to the coils 12, and a cover 14 is attached to a base 13' which rests on the spacer 13. The base 13' and the cover 14 may be composed of a suitable non-magnetic material, such as stainless steel.

Figure 2:
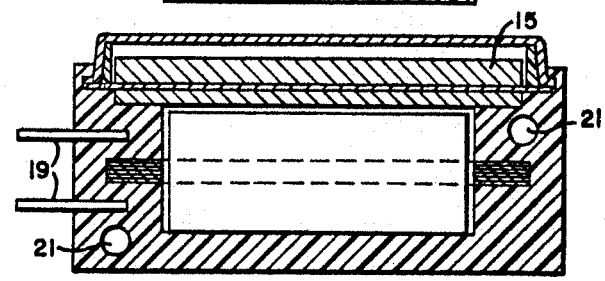
FIGURE 2 is a view, partly in section and partly in side elevation, of the switching device as shown in FIG. 1.

A permanent magnet 15 is so mounted between the cover 14 and the base 13' that it is freely movable in a vertical plane, as shown in FIGS. 1 and 2, within the enclosure formed by the base 13 and the cover 14. In order to permit the magnet to move freely, the enclosure may be lined with a material 16, such as nylon, which has a low coefficient of friction.

The core 11, the coils 12, and a portion of the enclosure for the magnet 15 may be surrounded with a molded insulating material 17. Terminal connectors 19 are provided for making electrical connections to the coils 12. Mounting holes 21 may be provided for attaching the unit to a supporting structure. The permanent magnet 15 may be composed of any suitable magnetic material such as an aluminum, nickel, cobalt, iron alloy.

As shown in FIGS. 1 and 2, when a shorting bar is not near the switch unit the magnet 15 is drawn close to the reactor core by magnetic attraction. Consequently, the magnetic core is saturated with flux from the magnet and the reactor has a low impedance. This condition is utilized to provide an output signal to operate magnetic logic elements in a manner which will be described more fully hereinafter.

Figure 3:
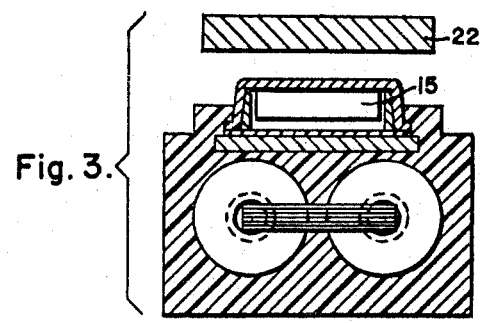
FIG. 3 is a view, similar to FIG. 1, showing the magnet in a position in which the core of the reactor is not saturated.
Figure 4:
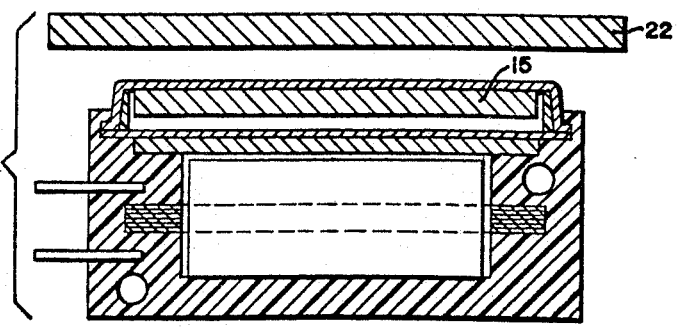
FIG. 4 is a view, similar to FIG. 2 with the magnet in the same position as shown in FIG. 3.

As shown in FIGS. 3 and 4, when a shorting bar 22, which is composed of iron or other magnetic material, approaches the switch unit the magnet 15 is attracted to both the reactor core and the shorting bar. At some point the attraction to the shorting bar exceeds the force of attraction to the reactor core. The magnet 15 is then drawn away from the reactor core until it hits the retaining cover 14. It will be held there so long as the shorting bar is present. During this time the output signal of the switching device has gone from full "on" to full "off." At first the output signal will go "off" slowly and then rapidly as the magnet begins to move.

When the shorting bar 22 is moved away, the magnet drops back to its initial position. The output signal will increase slowly at first and then rapidly as the magnet starts to drop. Thus, the device functions in a manner similar to a switch having contact members which are opened and closed by an actuating force. The present switch will work in any position and does not depend upon gravity to function properly.

The main purpose in having the magnet move is to increase the "off" to "on" flux change or saturation in the reactor core. In this manner the capacity is greatly increased as the core may now be more fully saturated in the "on" position to give good regulation of the output and still have a low saturation in the "off" position to give a low "off" signal. Also, the movement of the magnet provides a rapid change in the output during the most critical part of the switching operation. Thus, when the device is utilized in a system with control contactors or relays, there is less chance of causing vibration of the contact members of the relays during their operation.

Figure 5:
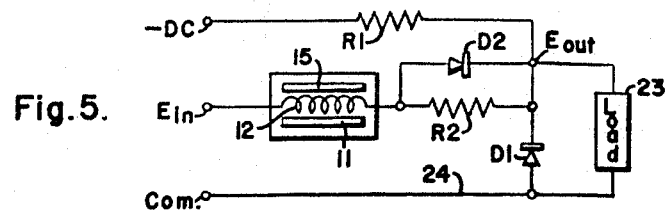
FIG. 5 is a diagrammatic view of a switching system in which the present switching device is utilized.

As previously stated, the present device may be utilized to control the operation of a magnetic logic element. A typical circuit is shown in FIG. 5. This circuit may be of the type fully described in a copending application of G. E. King, and M. P. White, Serial No. 604,171, filed August 15, 1956. The coils of the reactor are connected in series-circuit relation. As shown in FIG. 5, the coils 12 are connected in series with a resistor R2. One terminal of one coil is connected to a terminal $E_{in}$. One terminal of the resistor R2 is connected to an output terminal $E_{out}$ of a control board. A load circuit 23 is connected between the output terminal and a common conductor 24. A suitable source of alternating current power is connected across the input terminal $E_{in}$ and the common conductor 24. A rectifying element D1, which has a high resistance to current flow in the one direction, is connected parallel to the load circuit 23. A similar rectifying element D2 is connected parallel to the resistor R2. A resistor R1, one terminal of which is connected to a negative D.C. voltage provides a path for the reactor exciting current thereby preventing the exciting current from going through the load circuit.

As previously explained, the reactor core 11 is saturated when the magnet 15 is adjacent to the core. When the reactor core is saturated, only a small part of the applied voltage is absorbed by the reactor and most of the voltage appears across the load circuit as half-wave D.C. During one-half of each cycle, when the voltage $E_{in}$ may be considered positive, current flows from the terminal $E_{in}$ through the coils of the reactor, the rectifier D2, and through the load circuit 23 to the common conductor 24. During the other half-cycle, when $E_{in}$ may be considered negative, current flows through the common conductor 24, the rectifier D1, the resistor R2 and the coils of the reactor to the terminal $E_{in}$.

When the magnet 15 is attracted toward the shorting bar, its flux is shunted through the shorting bar 22 and very little passes through the reactor core. Thus, the impedance of the reactor is high and substantially all of the applied voltage is absorbed by the reactor.

It will be noted that when the voltage $E_{in}$ is positive, the output current does not flow through the resistor R2 but passes through the rectifier D2 which has a low forward voltage drop. Thus, the regulation of the circuit is improved.

When the voltage $E_{in}$ is negative, the reset or demagnetizing current flows through the resistor R2 and resets the limit switch reactor core. The ohmic value of the resistor R2 may be made relatively high, thereby reducing the reset or demagnetizing current.

From the foregoing description it is apparent that the invention provides a contactless switch of the saturable reactor type which is particularly suitable for controlling the operation of magnetic logic elements. The present switch has a relatively high output and provides a rapid change in the output during the critical part of the switching operation. Furthermore, the switch is simple in construction and the members of the switch unit itself may be totally enclosed, thereby protecting them from foreign matter. It will be understood that the shorting bar may be mounted on a moving member of the machine being controlled or it may be a part of the moving member.

Since numerous changes may be made in the above-described construction and different embodiments of the invention may be made without departing from the spirit and scope thereof, it is intended that all matter contained in the foregoing description or shown in the accompanying drawings, shall be interpreted as illustrative and not in a limiting sense.

I claim as my invention:

1. In a switching assembly, in combination, a core composed of a magnetic material, a coil disposed on said core, an unattached magnet freely movable a predetermined distance from a position in the magnetic circuit for the core to a position out of said magnetic circuit, a member composed of magnetic material movable to a position to attract the magnet from its position in the magnetic circuit for the core to its position out of said magnetic circuit, and a non-magnetic enclosure for limiting the movement of the magnet between said positions to prevent the magnet from engaging said member and said core.

2. In a switching assembly, in combination, a core composed of a magnetic material, coils disposed on opposite legs of the core, said coils being connected in series-circuit relation, an unattached magnet movable toward the core by magnetic attraction to aid the coils in saturating the core, a member composed of magnetic material movable to a position to attract the magnet away from the core to decrease the saturation of the core, non-magnetic means for preventing the magnet from engaging said member, and a non-magnetic spacer for limiting the movement of the magnet toward the core.

3. In a switching assembly, in combination, a core composed of a magnetic material, coils disposed on opposite legs of the core, said coils being connected in series-circuit relation, an unattached magnet movable toward the core by magnetic attraction to aid the coils in saturating the core, a member composed of magnetic material movable to a position to attract the magnet away from the core to decrease the saturation of the core, and non-magnetic mechanical means for limiting the movement of said magnet toward and away from the core to prevent the magnet from engaging said member and said core.

4. In a switching assembly, in combination, a core composed of a magnetic material, coils disposed on opposite legs of the core, said coils being connected in series-circuit relation, a magnet movable toward the core by magnetic attraction to aid the coils in saturating the core, a member composed of magnetic material movable to a position to attract the magnet away from the core to decrease the saturation of the core, and non-magnetic means enclosing said magnet to limit its movement toward and away from the core to prevent the magnet from engaging said member and said core.

5. In a switching assembly, in combination, a core composed of a magnetic material, coils disposed on opposite legs of the core, said coils being connected in series-circuit relation, a magnet movable toward the core by magnetic attraction to aid the coils in saturating the core, a member composed of magnetic material movable to a position to attract the magnet away from the core to decrease the saturation of the core, non-magnetic means enclosing said magnet to limit its movement toward and away from the core to prevent the magnet from engaging said member and said core, and lining means in said enclosing means to reduce the friction between the magnet and the enclosing means.

References Cited in the file of this patent

UNITED STATES PATENTS

| | | |
|---|---|---|
| 2,691,768 | Janssen | Oct. 12, 1954 |
| 2,719,276 | Allison | Sept. 27, 1955 |
| 2,736,869 | Rex | Feb. 28, 1956 |
| 2,786,702 | Teetor | Mar. 26, 1957 |
| 2,848,699 | Allison | Aug. 19, 1958 |
| 2,856,591 | White | Oct. 14, 1958 |
| 2,913,688 | Slebodnik | Nov. 17, 1959 |